April 1, 1924.

B. H. MARCUS 1,489,091

HOOK AND EYE FOR BELTS AND THE LIKE

Filed Feb. 3, 1923

Inventor
Benjamin H. Marcus
By his Attorney
Maurice Block

Patented Apr. 1, 1924.

1,489,091

UNITED STATES PATENT OFFICE.

BENJAMIN H. MARCUS, OF BROOKLYN, NEW YORK, ASSIGNOR TO SHOOR-ON MFG. CORPORATION, OF NEW YORK, N. Y., A CORPORATION OF NEW YORK.

HOOK AND EYE FOR BELTS AND THE LIKE.

Application filed February 3, 1923. Serial No. 616,678.

*To all whom it may concern:*

Be it known that I, BENJAMIN H. MARCUS, a citizen of the United States of America, residing at Brooklyn, Kings County, State of New York, have invented certain new and useful Improvements in Hooks and Eyes for Belts and the like, of which the following is a specification.

This invention relates to fasteners and in particular to the type used in connecting the ends of belts, and an object of the invention is to produce a hook and eye fastener, the parts of which can be inserted into the belt simultaneously with the manufacture of both the hook and eye pieces.

A particular object of the invention is the provision of a hook and its matching eye which, when inserted into the material of the belt will be so shaped that it will not pull out of the material.

A further object is to produce a fastening of the character described which can be economically and efficiently manufactured, it being understood that I do not wish the use of the fastener to be limited to belts.

Referring to the drawings wherein one embodiment of my invention is illustrated;

Figure 1:
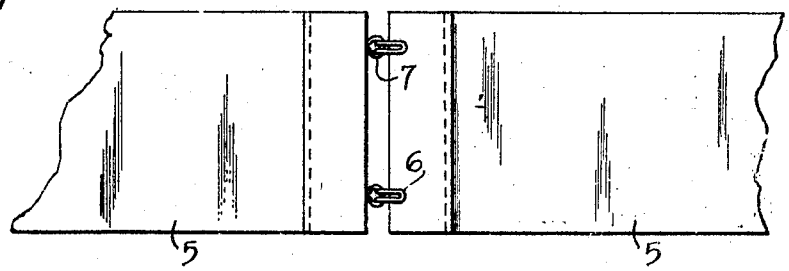
Fig. 1 is a front view of a portion of a belt, the ends thereof being connected by my improved fastener.
Figure 2:
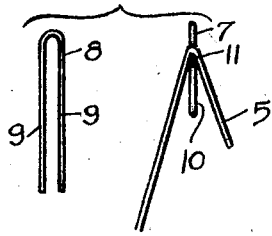
Fig. 2 is a sectional view through the end of a belt, the flap end thereof being unsewed and showing the position of the eye member after insertion.
Figure 3:
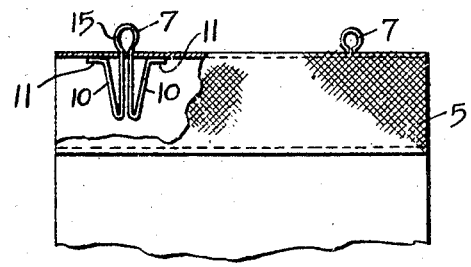
Fig. 3 is a plan view of the eye end of the belt, a portion thereof being broken away to disclose the shape of the eye member.
Figure 4:
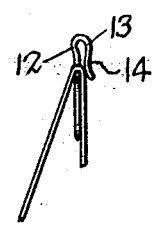
Fig. 4 is a view similar to Fig. 2, the hook member being shown in connection with the end of a belt.
Figure 5:
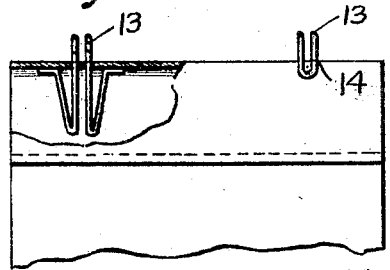
Fig. 5 is a view similar to Fig. 3 showing the hook end of the belt.

Referring to the drawings in detail, 5 indicates the belt which may be of thin leather buckram, canvas or any suitable material, in the ends of which are inserted the hook members 6 and eye members 7. In producing the hook and eye members 6 and 7, I provide a stiff wire which is bent in the form of a staple 8 (see Fig. 2), the ends of the legs 9 of which are punched through the belt material and then the legs are each bent adjacent their mid-portion to form the obliquely disposed portions 10, the ends of which are again bent outwardly and horizontally as at 11 to underlie the belting material 5 and provide for each of the hook and eye members a footing which will resist, against the material, any attempt to draw either member out of the material. This feature is considered extremely important because in belting material used, the same being more or less heavy, it is found unsatisfactory to sew the hooks or eyes to the belting. Therefore, I form my hooks and eyes at the same time as they are assembled with the belting, in fact the very forming operation includes their insertion into the belting.

Figure 6:
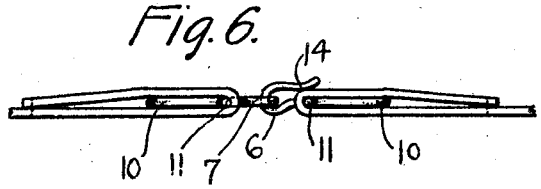
Fig. 6 is an enlarged edge view showing the method of connecting the hook and eye members to retain the ends of a belt together.

The hook member is then bent over at its upper end 12 to provide a hook portion 13, the extreme end of which is curved as at 14 so that when the hook is in the material (see Fig. 6) this curved part 14 lies against the belting material. The hook 6, of course, is somewhat resilient and the eye 7 must be snapped under this curved part 14 and when in the hook portion 13 will not fall out, as is the case with many forms now in use.

The eye member 7 is, of course, formed in the same manner as the hook member beneath the belting material, but instead of being bent, the wire is simply rounded as at 15 to form the eye, and it will be noticed that this eye 15 is larger than the width of the legs of the wire staple where it enters the material and therefore prevents the eye from moving towards the material to close said eye and to require its being drawn out every time the hook is to be passed therethrough.

The belt material 5 is folded over the shank portions of the hooks and eyes and securely sewed, so that the only part showing is the hook and eye portions and they are exactly on the edge of the belt, so that when fastened together the belt can lie perfectly flat.

Particular attention is called to the fact that the curved part 14 of the hook member 6 acts in the same capacity as the eye part 15 in preventing the hook from drawing down against the material. The hook and eye members are therefore retained at all times in their extreme outward positions and cannot be drawn out of the material, nor will they tend to tear out of the belt material inasmuch as the horizontal portions 11 of the shanks provide a greater bearing surface.

Figure 7:
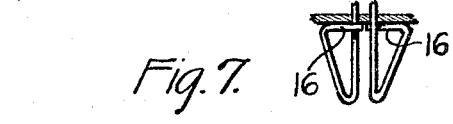
Fig. 7 is a detail view of a part of a hook member showing a modified method of bending the shank of the hook to prevent the same from pulling out of the material.

In Figure 7 I show the horizontally bent portions 11 extending inwardly as at 16 instead of outwardly whereby any tendency of the obliquely disposed portions to spread is overcome.

My invention is therefore not confined to any particular article of goods but rather can be applied where a strong dependable hook and eye is necessary.

It will be noted that the expanded portion of the shank will provide a finger piece through the use of which the hooks and eyes may be more readily separated when used in soft material.

Having described my invention what I claim is:—

1. The method of making the eye member of a combination hook and eye fastening device which consists in providing a staple, forcing the staple through the material, forming an eye at the upper end of the staple so that the eye rests upon the goods, bending the legs of the staple back obliquely to touch the material and then bending said legs to form outwardly horizontal yielding portions which contact with the material.

2. The method of making the hook member of a combination hook and eye fastening device which consists in providing a staple, forcing the staple through the material, forming a hook portion on the upper end of the staple bending the legs of the staple back obliquely and outwardly to touch the material and then bending the ends of said legs outwardly to form horizontal portions which contact throughout their length with the material, and bending a portion of the hook so that it will press against the material at a point where the leg portions pass therethrough.

BENJAMIN H. MARCUS.